A. L. POWELL.
TRANSMISSION FOR ENGINES.
APPLICATION FILED DEC. 8, 1920.

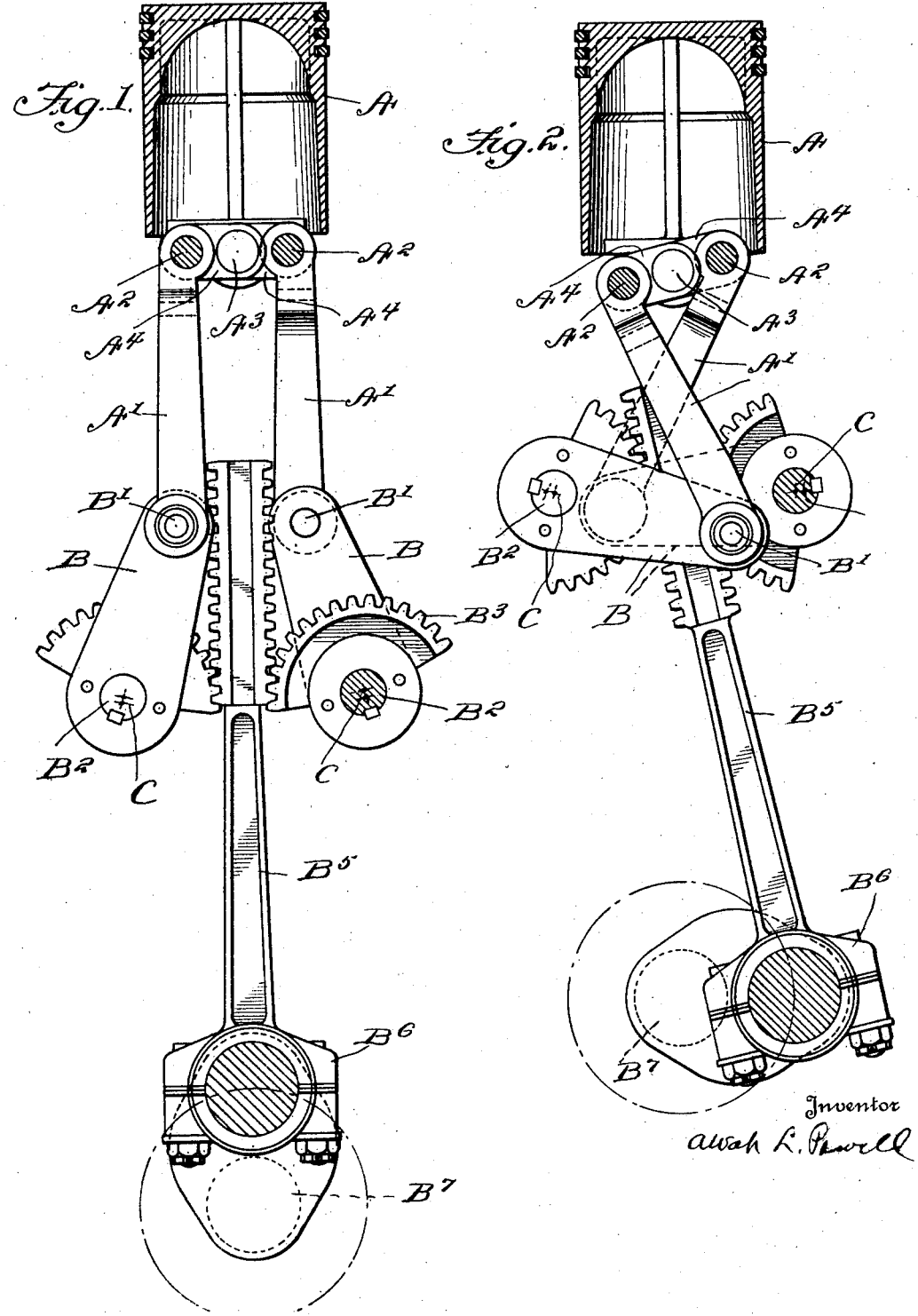

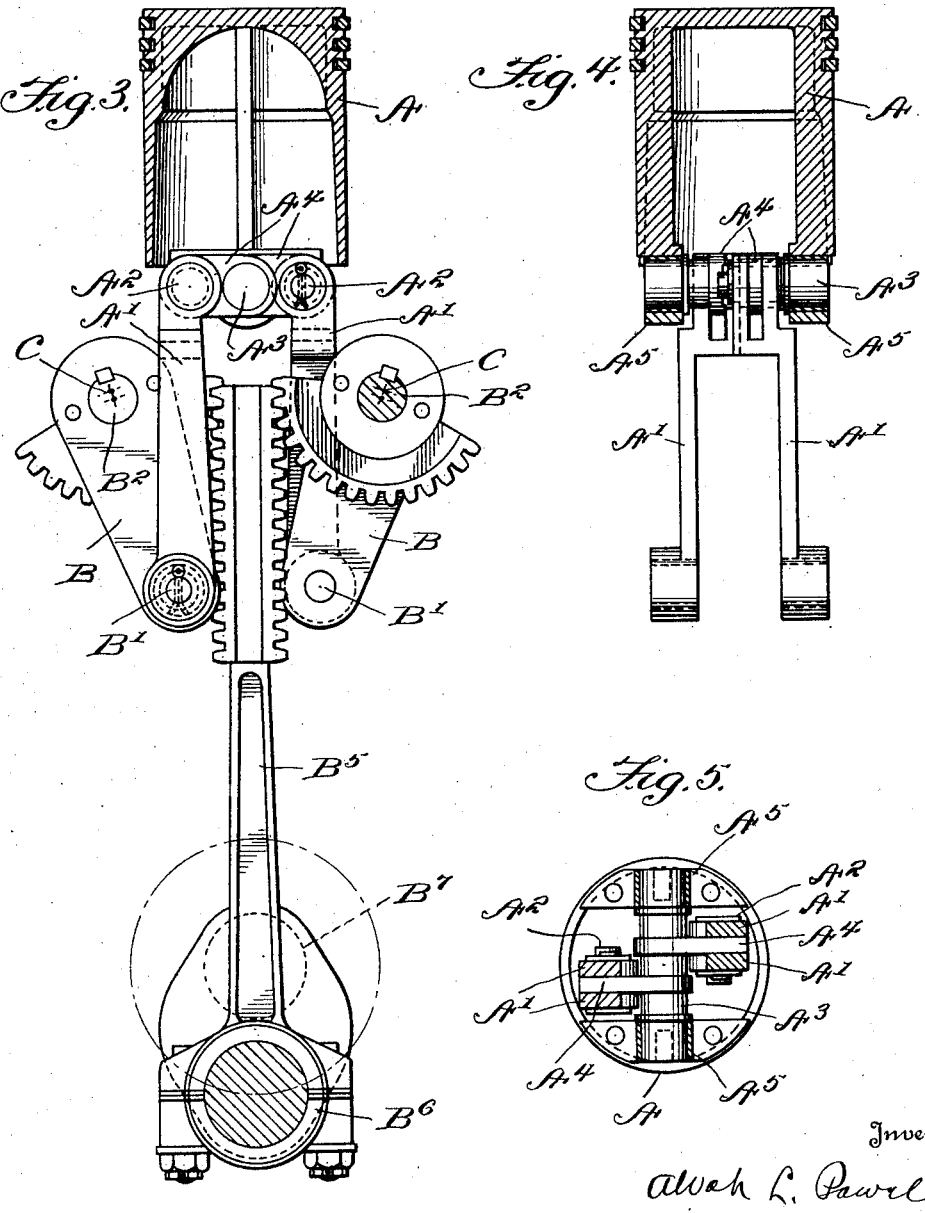

1,384,338.

Patented July 12, 1921.
4 SHEETS—SHEET 3.

Inventor
Alvah L. Powell

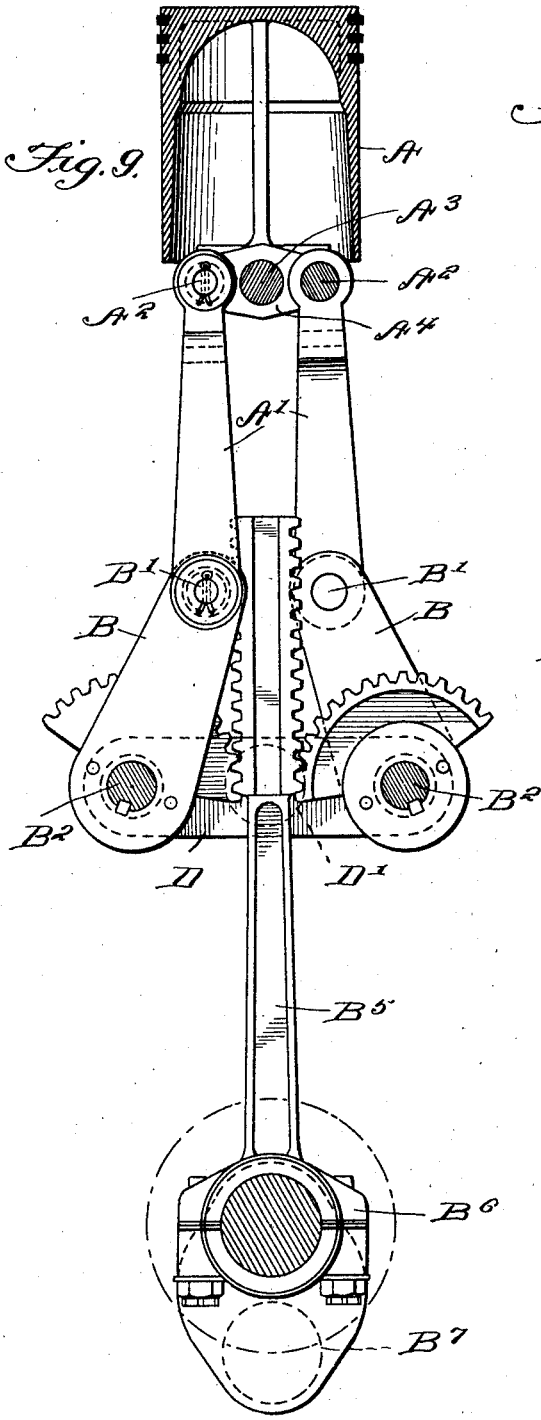
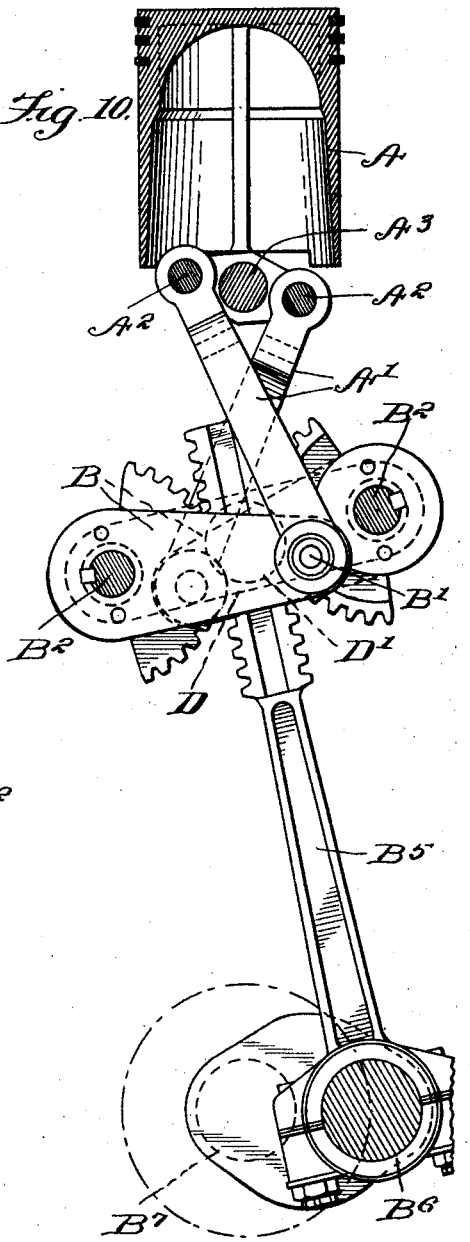

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,338.

Specification of Letters Patent.    Patented July 12, 1921.

Application filed December 8, 1920. Serial No. 429,172.

*To all whom it may concern:*

Be it known that I, ALVAH L. POWELL, a citizen of the United States, residing at Miles City, in the county of Custer and State of Montana, have invented certain new and useful Improvements in Transmission for Engines, of which the following is a specification.

My invention relates to improvements in the transmitting member of engines by which I secure a variation in the movement of the piston with reference to that of the crank, enabling me to gain advantages in the operation of such engines that are not possible with the constructions at present used. This application is an improvement over the form shown in the applications filed simultaneously with this, bearing Serial Numbers 429,168, 429,170 to 429,176, inclusive, but while the general principles are the same, I derive advantages from the use of the improvement herein described that are not covered in other applications. My improvement lies in a method of compensating for variations of movement in the transmitting members by which I provide for the angularity of motion of the crank connecting rod in such engines. The means I employ for this purpose are illustrated in the drawings, in which—

Figures 1, 2, 3 and 4 are elevations, partly in section.

Fig. 5 is a plan of the piston from the open end, showing the link connections.

Figs. 9 and 10 show the transmitting mechanism in Fig. 6 at different points of stroke.

In Fig. 1 the engine piston A has, at its lower end, lugs shown in plan in Fig. 5. These lugs are capped but the caps are removed in Fig. 5. The capped lugs, or bearings, support a pin $A^3$. This pin is held from lateral movement by two bushings having shoulders that bear against the lugs and caps $A^5$, $A^5$. On the pin $A^3$ are two links $A^4$, $A^4$, Fig. 4, that are shown as integral with the said pin, but they may be separate and attached to $A^3$ by pins or keys. The links carry pins $A^2$, $A^2$, on which are hung pitman rods, $A^1$, $A^1$, that are attached to crank levers, B, B, by pins $B^1$, $B^1$ Fig. 1. The crank levers are pivoted on the pins $B^2$ suitably supported in the engine frame. These lever cranks are, in all respects, similar to those shown in my previous applications. On the pins $B^2$, $B^2$, are segmental pinions, toothed as shown. These pinions are keyed to the said pins. The lever cranks, B, B, are also keyed thereto, so that any movement of the lever cranks is transmitted by the pinions. The pinions mesh with a toothed bar, forming part of a crank connecting rod, such as I would preferably employ. The lower end of this toothed rod $B^5$ is held in relation to the crank of engine by means of a cap, $B^6$, of conventional construction.

On the downstroke of piston its movement will be transmitted to the crank levers B, B, causing the partial rotation of the segmental pinions. The motion of these pinions will be imparted to the toothed rod, causing it to move downward and giving motion to the shaft crank, $B^7$, Fig. 1. As the crank advances, the toothed connecting rod will be thrown on an angle, as shown in Fig. 2. This movement changes the distance between the pinions and toothed connecting rod and, unless means for compensating for the variation were provided, the points of contact of the teeth would so alter that their action would be ineffective at some points of stroke. To provide for this I cause the segmental pinions to be placed on the pins $B^2$, $B^2$, eccentrically to the said pins, as indicated by dotted lines at C, C, Fig. 1. The effect of this is to cause the pinions to vary as they turn, thus following the variation in position of the connecting rod, and assuring proper tooth alinement. As the links $A^4$, $A^4$, and pitmen $A^1$, $A^1$ compensate for the lateral motion of the lever cranks B, B, and the eccentricity of the connecting rod $B^5$, it will be seen that the structure shown will transmit the movement of the piston A to the crank $B^6$ in an efficient manner.

Figure 6:
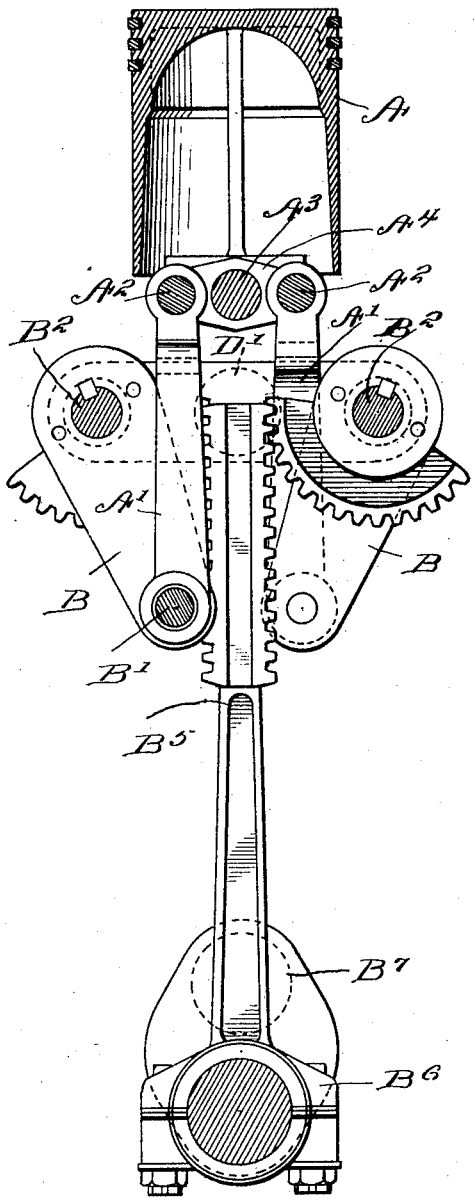
Fig. 6 is an elevation, showing a modification of my compensating mechanism.
Figure 7:
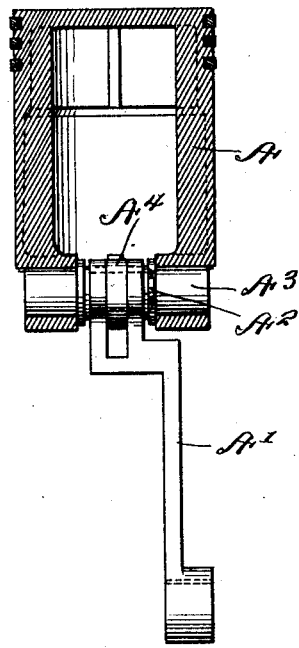
Fig. 7 is a sectional view of piston, showing link connections that I show in the arrangement given in Fig. 6.
Figure 8:
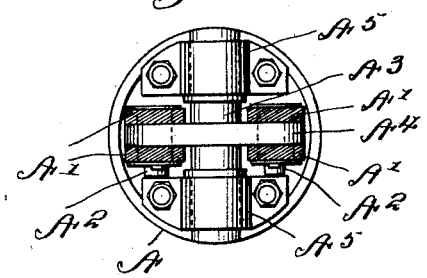
Fig. 8 is a plan view of the open end of piston, with link connections attached.

In Figs. 6, 7 and 8, I show a modification of the means for securing the eccentric action of the pinions with relation to the toothed connecting rod. In this construction, I preferably pivot the pins $B^2$, $B^2$ in supporting bars, as shown at D, Figs. 6 and 9. Only one bar is given, but it is evident that two would be required; that is, one on each side. These bars are pivoted at D¹, preferably on studs in the engine frame. This pivoting means is shown in dotted lines in Figs. 6, 7, 9, 10. During the stroke of the crank the bar D rocks slightly, as the connecting rod varies its position with reference to the segmental pinions. The action is the same as in the former construction, but the lateral movement is secured by an auxiliary means; that is, by a pivoted bar, oscillating synchronously with the other members.

It is evident that changes may be made in the arrangement of parts by which I secure the results I have described without departing from the principle of my invention. I do not limit myself to the exact construction shown.

What I believe is new and ask to have protected by Letters Patent, is:

1. In a differential transmission member, the combination of a piston, lugs on said piston, a bar pivoted on said lugs, supporting pins, levers mounted on said pins, pins in said levers, links from the said bar to the said last mentioned pins, segmental pinions eccentrically mounted on the said supporting pins, a crank shaft, a crank, a connecting rod, racks on said connecting rod, and means whereby the said racks engage the said eccentrically mounted pinions, for the purpose herein described.

2. In an engine, a differential transmission member consisting of supporting pins, levers mounted on said pins and rotatable therewith, pinions on said pins rotatable with said levers, a crank connecting rod, racks on said crank connecting rod and moving between said pinions and meshing therewith, a pin, a bar loosely mounted on said pin, a piston, lugs on said piston for supporting said pin, and links from said bar to the transmission levers, for the purpose herein described.

In testimony whereof I affix my signature.

ALVAH L. POWELL.